United States Patent [19]

Lee

[11] Patent Number: 5,271,247
[45] Date of Patent: Dec. 21, 1993

[54] COOLING DEVICE FOR A HERMETIC MOTOR-DRIVEN COMPRESSOR

[75] Inventor: In S. Lee, Seoul, Rep. of Korea

[73] Assignee: Gold Star Co., Ltd., Seoul, Rep. of Korea

[21] Appl. No.: 899,544

[22] Filed: Jun. 16, 1992

[30] Foreign Application Priority Data

Jun. 24, 1991 [KR] Rep. of Korea ............. 10480/1991

[51] Int. Cl.⁵ .................. F25B 43/02; F04B 17/00; F04B 35/00
[52] U.S. Cl. ......................... 62/468; 62/84; 417/902
[58] Field of Search .................. 62/468, 505, 84; 417/366, 368, 902

[56] References Cited

U.S. PATENT DOCUMENTS

| | | | |
|---|---|---|---|
| 3,396,903 | 8/1968 | Oya | 417/902 X |
| 3,407,990 | 10/1968 | Schaefer | 417/902 X |
| 3,544,240 | 12/1970 | Rundell | 417/902 X |
| 3,606,594 | 9/1971 | Lewis et al. | 417/902 X |
| 3,664,771 | 5/1972 | Suzuki et al. | 417/902 X |
| 3,692,435 | 9/1972 | Iida et al. | 417/902 X |
| 4,431,383 | 2/1984 | Boehmler et al. | 417/902 X |
| 4,478,559 | 10/1984 | Andrione et al. | 417/902 X |
| 4,569,639 | 2/1986 | Hannibal et al. | 417/902 X |
| 4,576,555 | 3/1986 | Ashenfelter | 417/902 X |
| 4,718,830 | 1/1988 | Middleton et al. | 417/902 X |

FOREIGN PATENT DOCUMENTS 1476189 4/1989 U.S.S.R. .............................. 417/902

Primary Examiner—Henry A. Bennett
Assistant Examiner—Christopher B. Kilner
Attorney, Agent, or Firm—Finnegan, Henderson, Farabow, Garrett & Dunner

[57] ABSTRACT

This invention seeks to provide a cooling device for a hermetic motor-driven compressor, which may effectively carry out not only lubrication, but cooling of a piston and a cylinder by making refrigeration oil in a hermetic casing to circulate in the interior of the piston for removing frictional heat generated between the piston and the cylinder during operation. To this end, the device comprises a crankshaft for drawing up and spouting out the refrigeration oil circulating in the interior of the piston to cool the piston, and a movable portion formed integrally with the connection portion and linearly reciprocably movable in the cylinder for compressing refrigerant gas.

4 Claims, 2 Drawing Sheets

COOLING DEVICE FOR A HERMETIC MOTOR-DRIVEN COMPRESSOR

BACKGROUND OF THE INVENTION

1. Field of the Invention

This invention relates to a hermetic motor-driven compressor used in a refrigerator, an air condenser, or the like.

2. Description of the Prior Art

Generally, a hermetic motor-driven compressor comprises, as shown in FIG. 1 of the accompanying drawings, a shell or casing 1; a crankshaft 2 having eccentric portion 2a provided at its upper end and an oil passage 10 longitudinally formed therein, and rotatably driven by an electric motor (not shown) disposed within the casing 1; a reciprocating piston 3 coupled with the eccentric portion 2a of the crankshaft 2 by means of a slide member 6 which is attached to one end of the piston and slidably engaged with the eccentric portion of the crankshaft; a cylinder 4 providing a space for compressing refrigerant gas and receiving therein the piston 3 such that the piston is reciprocably movable in the cylinder with rotation of the crankshaft; and a head portion 5 connected to an opposite end of the cylinder from the piston.

In addition, the bottom of the casing 1 constitutes a sump filled with refrigeration oil in which the lower end of the crankshaft 2 is immersed. In operation of the hermetic motor-driven compressor thus constructed, as the crankshaft 2 is rotated by the motor, the piston 3 coupled with the crankshaft reciprocates within the cylinder 4, resulting in a change of pressure in the cylinder. As a result, the refrigerant gas in the casing 1 is drawn in and compressed within the cylinder, and then discharged out of the cylinder.

Also, during the operation of the compressor, the refrigeration oil in the lower portion of the casing is drawn up through the oil passage 10 formed in the crankshaft 2, while lubricating the crankshaft, and then spouted out through an opening of the upper end of the crankshaft. The spouted oil then falls downwardly to lubricate the contact surface of the piston 3 with the cylinder 4, and thereafter flows down to the sump in the lower portion of the casing.

Since during operation of the compressor the motor is driven at a high rotational speed in the range of 3200–3300 rpm, frictional heat is generated between the cylinder and the piston due to such a high speed rotation, and thus tends to elevate the temperature of the sucked refrigerant gas in the cylinder, thereby lowering volumetric efficiency and hence performance of the compressor.

In the past, attempts have been made to restrain generation of the frictional heat by supplying sufficient refrigeration oil to the contact surface of the piston with the cylinder so as to increase the lubrication effect. One such attempt is disclosed in Japanese Laid-Open Utility Model Publication No. SHO 60-139091, wherein a shell is formed on its upper surface with a protrusion of a circular arc shape centered on a central portion of the upper surface above an axis of a cylinder and protruding to a point closely adjacent to the periphery of the cylinder, whereby the refrigeration oil dashed against the protrusion is directed to a place requiring lubrication.

In another prior art as disclosed in Japanese Laid-Open Patent Publication No. SHO 56-156478, a slide tube integral with a piston is provided on its upper portion with a burring structure extending some distance above the peripheral surface of the piston such that the spouted refrigeration oil is guided by the structure. Still another prior art is shown in Japanese Laid-Open Patent Publication No. SHO 63-85270, wherein an eccentric shaft of a crankshaft and a larger diameter portion of a connecting rod engaged with the eccentric shaft both have oil passages extending transversely in a common horizontal plane.

The prior hermetic motor-driven compressors as discussed above are disadvantageous in that, while the arrangements provide somewhat effective lubrication of the contact surface of the piston with the cylinder by the refrigeration oil, they fail to satisfactorily prevent lower performance of the compressor due to frictional heat generated between the cylinder and the piston. Further, the prior arrangements additionally require a separate process of forming the protrusion on the upper surface of the steel casing, the burring structure on the upper portion of the slide tube, or the transverse oil passages in the eccentric shaft and the connecting rod, resulting in lower workability and higher manufacturing cost.

SUMMARY OF THE INVENTION

In view of the aforesaid drawbacks of the prior art, it is an object of the present invention to provide a simple cooling device for a hermetic motor-driven compressor, which may effect not only lubrication, but cooling of a high temperature section comprising a cylinder and a hollow piston by making the refrigeration oil spouted out at an upper end of a crankshaft during operation of the compressor to circulate in the interior of the piston.

To achieve the above object, there is provided according to one form of the present invention a cooling device for a hermetic motor-driven compressor, comprising a crankshaft for drawing up and spouting out refrigeration oil from an oil sump in a lower portion of a casing; and a hollow piston having inlet and outlet openings for passage of the refrigeration oil and coupled with the crankshaft to be linearly reciprocably movable in a cylinder for compressing refrigerant gas.

DESCRIPTION OF THE PREFERRED EMBODIMENT

Figure 1:
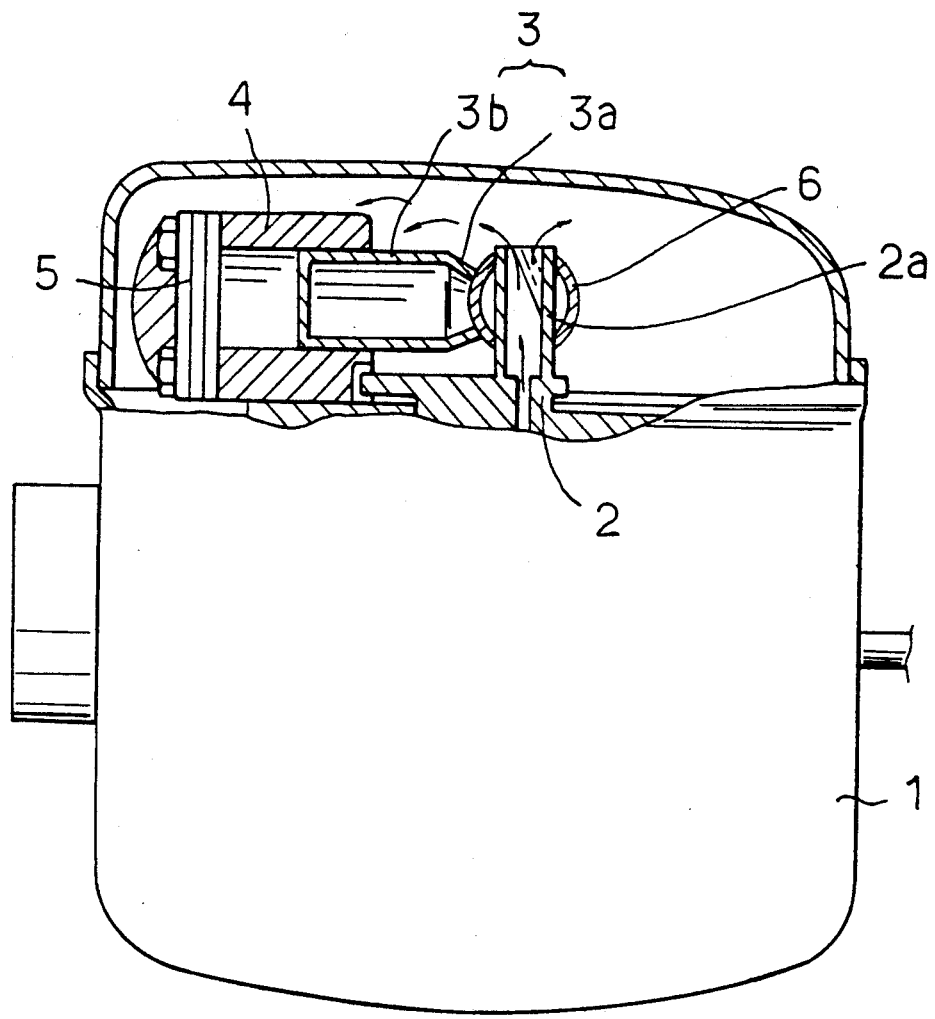
FIG. 1 is an elevational view, in partial section, of a conventional hermetic motor-driven compressor.
Figure 2:
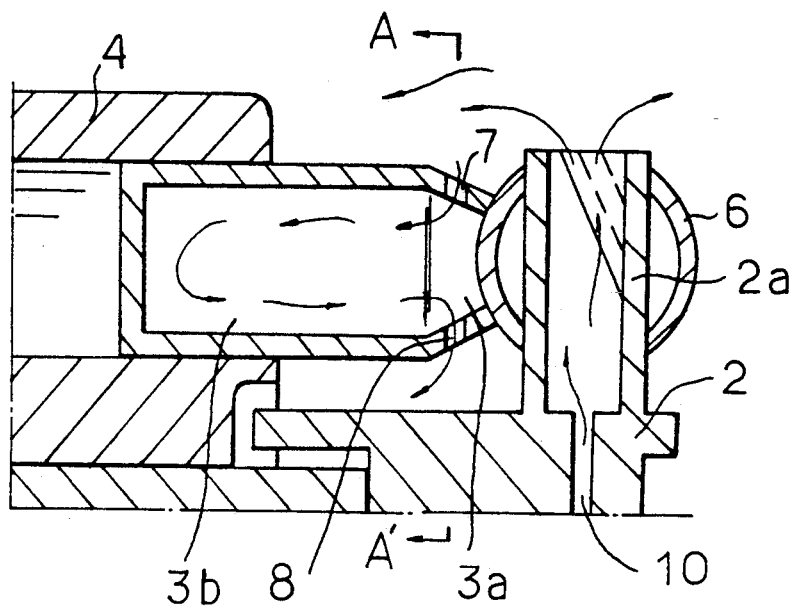
FIG. 2 is an enlarged cross-sectional view of a cooling device for a hermetic motor-driven compressor according to the present invention.

The invention will now be described in detail, by way of example, with reference to FIGS. 2 and 3 of the accompanying drawings. Reference is first made to FIG. 2 which illustrates an enlarged cross-sectional view of a cooling device for a hermetic motor-driven compressor according to a preferred embodiment of the present invention. A hollow piston 3 having a tapered connection portion 3a and a movable portion 3b formed integrally with the connection portion and reciprocably received in a cylinder 4 is coupled with an eccentric portion 2a provided at an upper end of a crankshaft 2 by means of a slide member 6 which is attached to the connection portion of the piston and slidably engaged with the eccentric portion of the crankshaft. During operation, therefore, the piston 3 lineraly reciprocates in the cylinder 4 with rotation of the crankshaft 2 to compress refrigerant gas in the cylinder.

In addition, in order to prevent elevation of the temperature of the refrigerant gas due to frictional heat generated between the piston and the cylinder during operation of the compressor, the piston has inlet and outlet openings 7 and 8 formed in upper and lower portions of the peripheral wall of the connection portion 3a in circumferentially spaced relation to each other. More particularly, as shown in FIG. 3, two circumferentially spaced outlet openings 8 are formed in the lower wall portion, and the upper inlet opening 7 is of size greater than the size of each outlet opening.

With this construction, during operation of the compressor, while the refrigeration oil spouted out at the upper eccentric portion 2a of the crankshaft 2 provides lubrication of the contact surface of the piston with the cylinder, the oil is in part introduced into the inner space of the hollow piston 3 through the upper inlet opening 7 formed in the connection portion 3a of the piston, circulates in the inner space with movement of the piston, and then is discharged through the lower outlet openings 8 of the connection portion 3a, thereby serving to remove the frictional heat generated between the piston and the cylinder.

Figure 3:
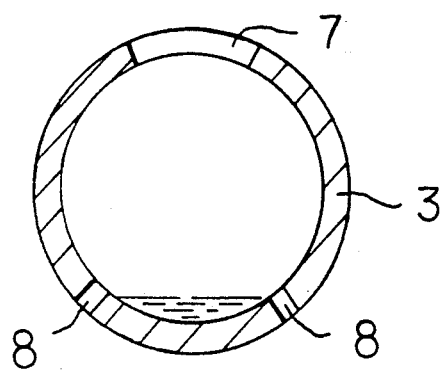
FIG. 3 is a cross-sectional view taken along line A–A' of FIG. 2.

The purpose of providing two outlet openings 8 at the lower portion of the peripheral wall of the connection portion 3a in circumferentially spaced relation to each other, but not forming one outlet opening centrally of the lower portion is, as shown in FIG. 3, to always maintain the given amount of the refrigeration oil in the interior of the piston at the level determined by the positions of the outlet openings, while discharging through the outlet openings the oil corresponding in amount to the amount of the oil being introduced through the inlet opening 7 of a size greater than the size of each outlet opening. Further, the purpose of providing the inlet and outlet openings 7 and 8 at the connection portion 3a of the piston is to prevent a lowering of compressing efficiency, which may occur when they are formed at the movable portion 3b of the piston, and to enable the spouted refrigeration oil to be easily introduced into the interior of the piston through the inlet opening formed in the sloping wall of the tapered connection portion 3a.

From the foregoing it will be appreciated that the present invention provides advantages over the prior art in that since the piston and the cylinder may be effectively cooled by the refrigeration oil circulating in the inner space of the piston without additionally forming a protrusion for a guidance of the refrigeration oil on the upper surface of the casing, performance of the compressor may be enhanced and simplification of the cooling device may be achieved, thereby resulting in enhancing of product quality and reduction in costs.

While the invention has been shown and described with particular reference to a preferred embodiment thereof, it will be understood that variations and modifications in detail may be made therein without departing from the spirit and scope of the invention as defined in the appended claims.

What is claimed is:

1. A cooling device for a hermetic motor-driven compressor, comprising:
   a crankshaft for drawing up and spouting out refrigerant oil in a lower portion of a casing; and
   a hollow piston coupled with said crankshaft to be linearly movable in a cylinder for compressing refrigerant gas, having an inlet opening and at least one outlet opening arranged in such manner that the spouted refrigerant oil comes into an interior of said hollow piston through said inlet opening, is retained within a volume defined by a lower circumferential surface of said hollow piston and said outlet opening, cools down said hollow piston in response to a reciprocal movement of said hollow piston, and floods through said outlet opening.

2. A cooling device as claimed in claim 1, wherein said inlet opening is formed at an upper portion of a circumferential surface of said hollow piston and said outlet opening at a lower portion.

3. A cooling device as claimed in claim 1, wherein said inlet and outlet openings are formed at a tapered piston portion connected to said crankshaft.

4. A cooling device as claimed in claim 2, wherein said inlet opening is formed at an upper portion of a circumferential surface of said tapered piston portion and said outlet opening at a lower portion.

* * * * *